(12) United States Patent
Lee et al.

(10) Patent No.: US 9,424,808 B2
(45) Date of Patent: Aug. 23, 2016

(54) IMAGE CROPPING MANIPULATION METHOD AND PORTABLE ELECTRONIC DEVICE

(71) Applicant: HTC Corporation, Taoyuan County (TW)

(72) Inventors: Huai-Che Lee, Taoyuan County (TW); Li-Cheng Chen, Taoyuan County (TW); Jenn-Wein Wu, Taoyuan County (TW); Hsin-Ti Chueh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 109 days.

(21) Appl. No.: 13/974,029

(22) Filed: Aug. 22, 2013

(65) Prior Publication Data

US 2015/0054854 A1  Feb. 26, 2015

(51) Int. Cl.
*G09G 5/373* (2006.01)
*G06F 3/0484* (2013.01)
*G06F 3/0488* (2013.01)
*G06T 3/00* (2006.01)

(52) U.S. Cl.
CPC ............. *G09G 5/373* (2013.01); *G06F 3/0488* (2013.01); *G06F 3/04845* (2013.01); *G06T 3/00* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,456,745 B1* | 9/2002 | Bruton et al. | 382/298 |
| 7,151,547 B2 | 12/2006 | Lin | |
| 7,675,528 B2 | 3/2010 | Walker, Jr. | |
| 2004/0202385 A1* | 10/2004 | Cheng | G06K 9/42 382/305 |
| 2005/0104897 A1* | 5/2005 | Walker et al. | 345/620 |
| 2006/0109282 A1* | 5/2006 | Lin et al. | 345/620 |
| 2006/0280364 A1* | 12/2006 | Ma et al. | 382/173 |
| 2010/0171712 A1* | 7/2010 | Cieplinski et al. | 345/173 |

FOREIGN PATENT DOCUMENTS

CN  1326574 A  12/2001

OTHER PUBLICATIONS

Office action mailed on May 25, 2015 for the Taiwan application No. 103100085, filing date Jan. 2, 2014, p. 1-6.

* cited by examiner

*Primary Examiner* — Ke Xiao
*Assistant Examiner* — Jed-Justin Imperial
(74) *Attorney, Agent, or Firm* — Winston Hsu; Scott Margo

(57) ABSTRACT

The invention discloses an image cropping manipulation method for use in a portable electronic device. The portable electronic device comprises a touch screen and an image processing unit. The method comprises: displaying a sub-image on the touch screen, the sub-image is cropped from a digital image; receiving a user input from the touch screen; in response to the user input, map the user input to an operation on the digital image; and performing the operation to update the sub-image.

14 Claims, 13 Drawing Sheets

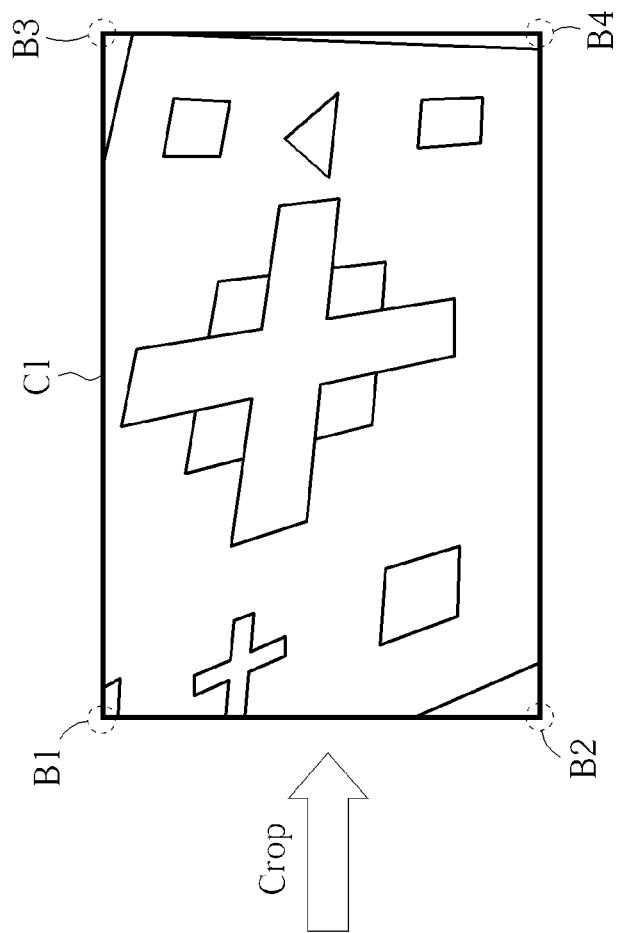
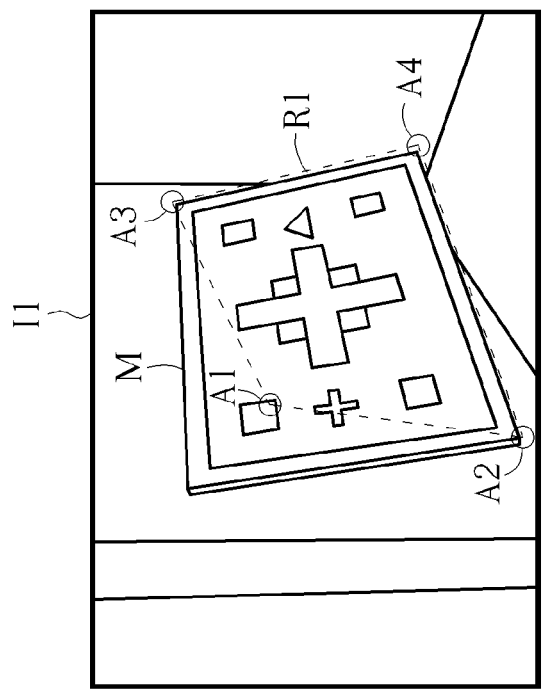
FIG. 1

IMAGE CROPPING MANIPULATION METHOD AND PORTABLE ELECTRONIC DEVICE

BACKGROUND OF THE INVENTION

1. Field of the Invention

The present invention relates to an image cropping manipulation method and a portable electronic device thereof, and more particularly, a cropping manipulation method for updating content of a cropped image according to user inputs.

2. Description of the Prior Art

Image cropping is one of the image editing tools often used by user. Conventionally, image cropping applications provide a cropping frame of certain shape, such as rectangular, circle or heart shape, etc. and user may move the cropping frame to desired position within the image and adjust the size of the cropping frame. The image cropping application would crop a sub-image according to the cropping frame and store the sub-image for other use. For example, the sub-image may be stored as a separate image, integrated with other images or image templates. Though the position and the size of the cropping frame can be designated by user, the respective shape and image distortion cannot be solved by image cropping application. For example, if an image comprising an object is taken in a non-front view angle, the shape of the object appears in the digital image would be distorted. For example, an object in rectangular shape might become in trapezoid shape, another object in round shape might become in elliptical. When cropping the object from the digital image, the distortion caused by the inclination will also be reflected in the cropped sub-image. This would cause inconvenient or uncomfortable viewing to the user, particularly in the case that the sub-image comprises text or other useful information. Fixing the distortion caused by viewing angle would be beneficial and improve image quality.

To solve above issues, the present invention provides a novel approach to manipulate image viewing angle and adjust distortion caused thereof.

SUMMARY OF THE INVENTION

In an embodiment of the invention, a portable electronic device for performing image cropping manipulation is disclosed. The portable electronic device comprises: a touch screen configured to display a sub-image and to provide a user interface for receiving at least one user input, the sub-image is cropped from a digital image; and an image processing unit configured to perform an operation corresponding to the user input. The image processing unit comprises: a space mapping module, configured to map the sub-image to an image space and map the user input to the operation in the image space; and an image cropping module, configured to perform the operation and update the sub-image according to the user input.

In another embodiment of the invention, an image cropping manipulation method for use in a portable electronic device is disclosed. The portable electronic device comprises a touch screen and an image processing unit, and the method comprises: displaying a sub-image on the touch screen, the sub-image is cropped from a digital image; receiving a user input from the touch screen; in response to the user input, map the user input to an operation on the digital image; and performing the operation to update the sub-image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates an image cropping manipulation for cropping a sub-region from a digital image according to one embodiment of the present invention.

DETAILED DESCRIPTION

To solve the problem addressed above, the present invention discloses an image cropping manipulation method and a portable electronic device implementing the image cropping manipulation method. In the disclosed image cropping manipulation method, a plurality of control points corresponding to a sub-region within a digital image are defined and adjusted in an image space, and a sub-image corresponding to the sub-region is determined and cropped from the digital image according to the control points.

Please refer to FIG. 1, which schematically illustrates an embodiment of image cropping manipulation. The image cropping manipulation may be performed on a mobile electronic device, such as a smart phone or tablet, and the mobile electronic device may comprise a touch screen and a camera. As shown in FIG. 1, a digital image I1 is retrieved and provided to a user. The digital image I1 can be captured by the camera and displayed on the touch screen. The digital image I1 can also be accessed from an internal storage unit, external storage device, or wirelessly from another data source, such as social service provider. The mobile electronic device may provide a user interface on the touch screen for user to perform operations on digital image I1. In embodiments of the invention, the user interface provides an image cropping function for user to crop a sub-image C1 from the digital image I1. The resulting sub-image C1 is displayed and can be further stored as a single image. Prior to storing the sub-image C1, user may send inputs to modify the sub-image C1 via the touch screen. For example, user may edit content of the sub-image C1. As shown in the embodiment of FIG. 1, the digital image I1 comprises an object M, which is a painting board. Each of the corners B1~B4 of the sub-image corresponds to one of the control points A1~A4 in the digital image I1 respectively. To generate the sub-image C1, a sub-region R1 defined by the control points A1~A4 is cropped from the digital image I1. The sub-image C1 may be properly scaled to desired resolution, such as full resolution. When user manipulates on the sub-image C1, position of corresponding control points A1~A4 would be updated accordingly, and consequently the content of the sub-image C1 is updated.

Figure 2:
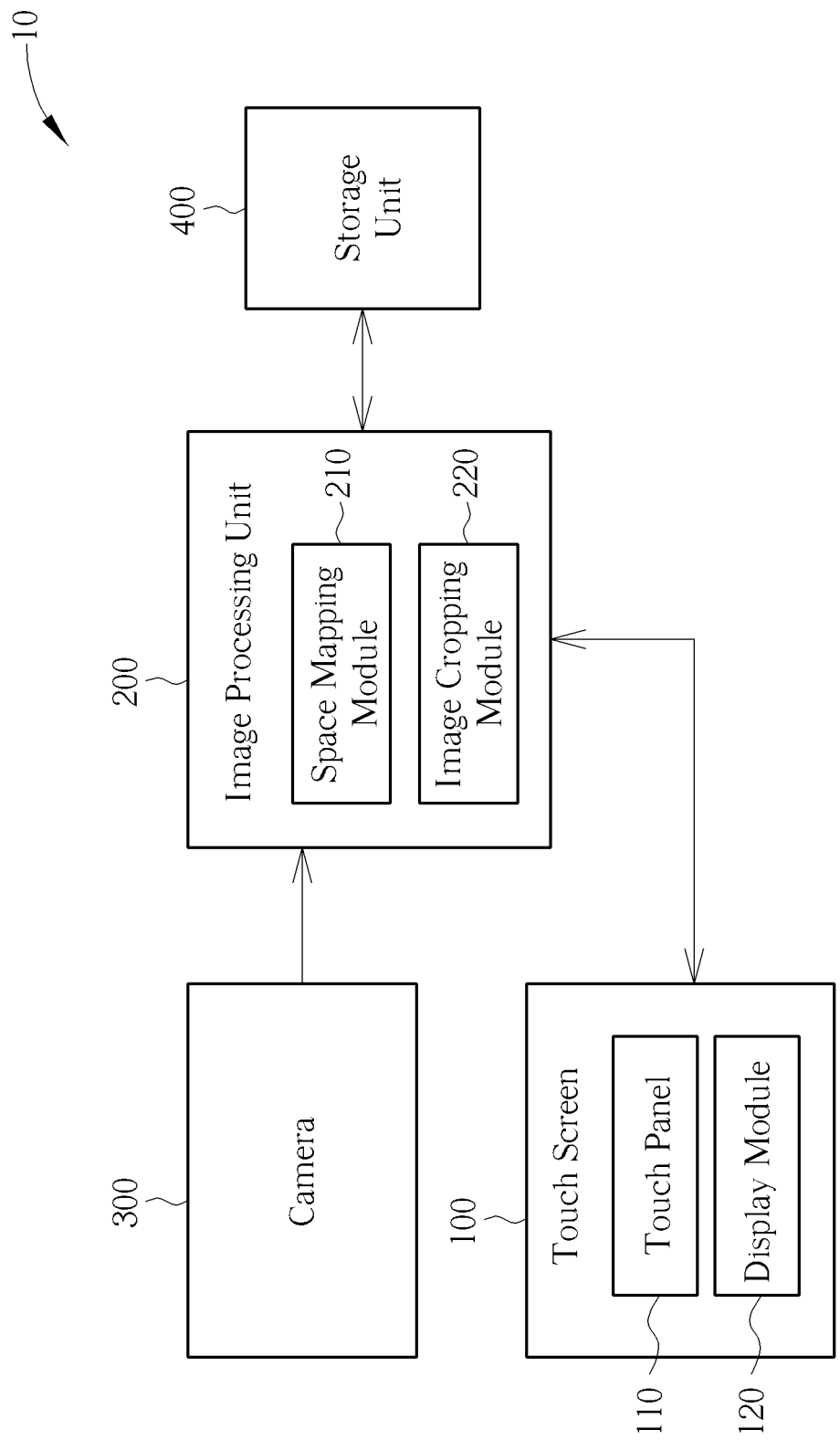
FIG. 2 illustrates a portable electronic device for implementing the image cropping manipulation method according to one embodiment of the present invention.

FIG. 2 illustrates a portable electronic device 10 for performing image cropping manipulation according to an embodiment of the invention. The portable electronic device 10 comprises, among other components, a touch screen 100, an image processing unit 200, a camera module 300 and a storage unit 400. The touch screen 100 is configured to display digital images and provide a user interface for receiving user inputs. The touch screen 100 further comprises touch panel 110 for receiving the user inputs and a display module 120 for displaying digital images and user interfaces. The image processing unit 200 is configured to access digital images and to perform various processing on the digital images. Digital images can be accessed from various image sources, such as the camera module 300 and/or the storage unit 400. Furthermore, the image processing unit 200 is configured to receive user inputs from the touch screen 100 and perform operations corresponding to the user inputs on the digital images. The processed digital images may be provided back to the touch screen 100 for display and/or be stored in the storage unit 400.

The image processing unit 200 further comprises at least a space mapping module 210 and an image cropping module 220. The space mapping module 210 is configured to define an image space and a cropping space, and convert user inputs received in one space to another. The image cropping module 220 is configured to crop a sub-region of a digital image according to the user input and provide a sub-image corresponding to the sub-region. The image cropping module 220 is further configured to adjust pixel values and/or positions in the sub-image according to the user input.

Described in more details with reference to FIG. 1, the touch screen 100 displays the digital image I1 and receives a user input for cropping a sub-region R1 from the digital image I1. Upon receiving the user input, the touch screen 100 may transmit the user input to the image processing unit 200. The space mapping module 210 may determine the position of the sub-region R1 in the digital image I1, and the image cropping module 210 crops and provides a corresponding sub-image C1. The sub-image C1 is then transmitted to the touch screen 100 for displaying to the user. As shown in FIG. 1, the space mapping module 210 defines an image space corresponding to the digital image I1 and a cropping space corresponding to the sub-image C1. The sub-region R1 is defined by four control points A1~A4 in the image space. The image cropping module 220 crops the sub-region R1 from the digital image I1 according to the control points A1~A4. Please note that the touch screen 100 may display a preview version of the digital image I1, which is of lower resolution. And the image cropping module 220 may perform image cropping on the digital image I1 in full resolution. The image cropping module 220 also performs other modifications such as scaling and/or morphing on the cropped sub-region M to generate the sub-image C1. Specifically, the image cropping module 220 may transform the sub-image C1 from a non-rectangular shape in the image space into rectangular shape in the cropping space.

Figure 3:
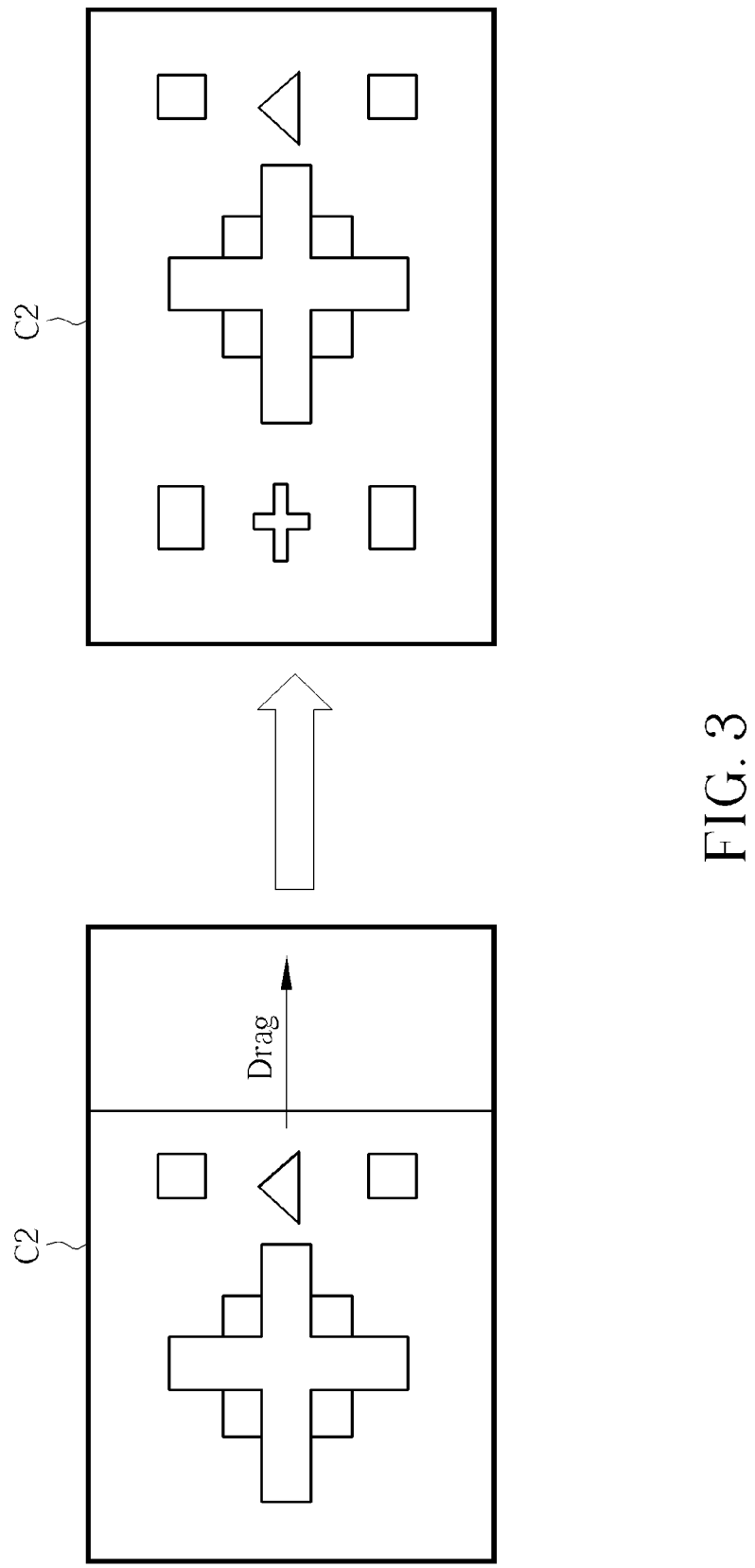
FIGS. 3-11 illustrate embodiments of image cropping manipulation of the invention in image space and cropping space and mapping mechanisms of the two spaces.
Figure 4:
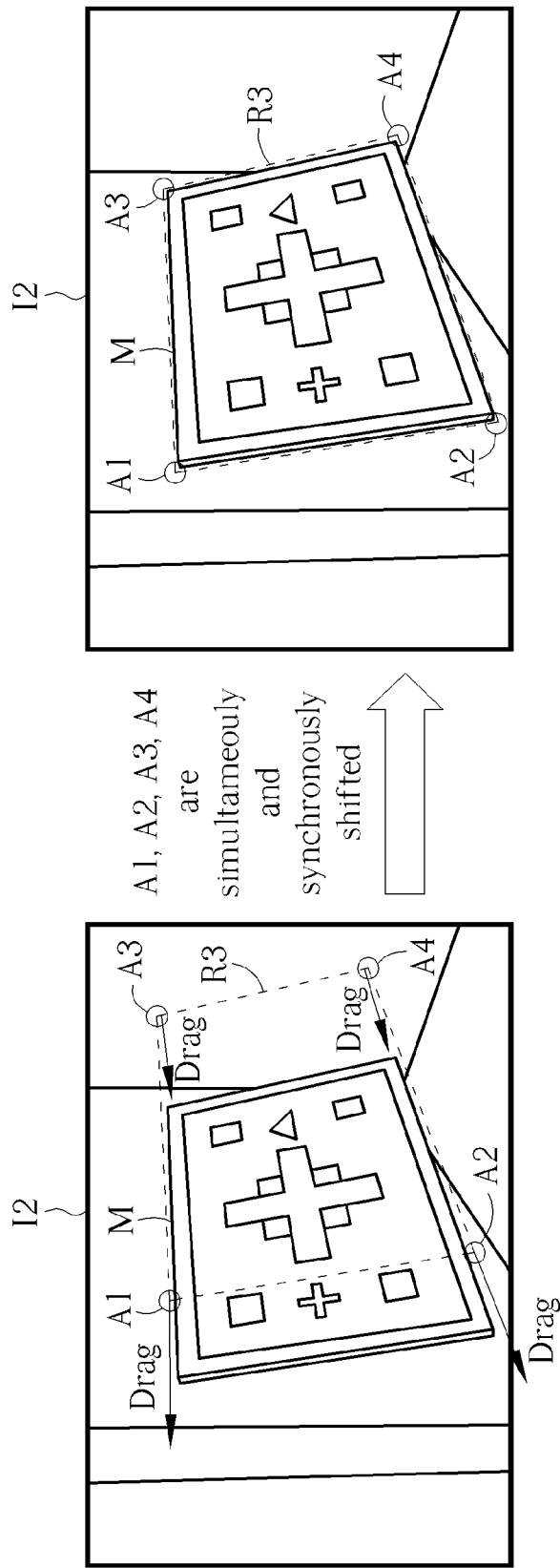

Please refer to FIGS. 3 and 4, which illustrate an operation of image cropping manipulation according to an embodiment of the invention. As shown in the left of FIG. 3 and with reference to FIG. 2, the image copping module 220 generates a sub-image C2 cropped from a digital image I2 and provides it for displaying on the touch screen 100 to the user. The digital image I2 is assumed to be in an image space and the sub-image C2 is assumed to be in a cropping space. The control points A1~A4 define the sub-region R2 corresponding to the sub-image C2 in the image space. User inputs received in the cropping space can be mapped to corresponding operations in the image space by the space mapping module 210. In this embodiment, the sub-image C2 initially does not fully cover the object N in the digital image I2. User may send user inputs via the touch screen 100 to update content of the sub-image C2. Since the most left part of object N is not shown, user may drag his/her finger from left to right on the touch screen 100 until the sub-image C2 is fully covered by the object N, as shown in the right of FIG. 3. To update the content of the sub-image C2, the space mapping module 210 maps the drag user input in the cropping space to operations on the control points A1~A4 in the image space. The control points A1~A4 are moved from right to left in relative opposite direction to the user input. In this embodiment of the invention, the control points A1~A4 are moved synchronously. However, in other embodiments of the invention, each of the control points A1~A4 may be adjusted independently.

Figure 5:
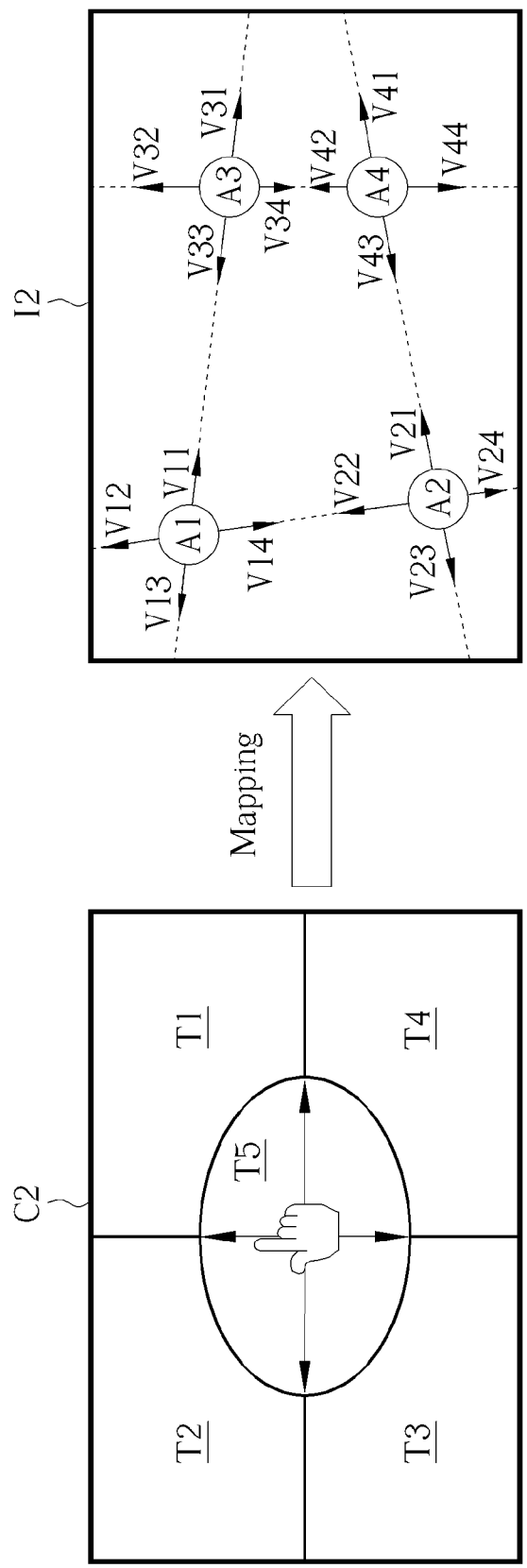

FIG. 5 illustrates a space mapping mechanism according to an embodiment of the invention. The space mapping mechanism may be performed by the space mapping module 210. In the cropping space where the sub-image C2 lies in, a plurality of control regions T1~T5 are defined. At least a portion of the control regions, in this embodiment T1~T4, correspond to the control points A1~A4 in the image space respectively. For a given control region, user inputs received in that region are mapped to operations of corresponding control points. For example, user inputs received in control region T1 are mapped to operations of the control point A1. By manipulation of user input in the control region T1, user may change position of the control point A1 in the image space and thus change content of the sub-image C2 nearby control region T1. For the center control region T5, user inputs received in this region would be mapped to all of the control points A1~A4, causing them to move positions synchronously.

Please note that, in the image space the control points A1~A4 may not form a rectangular or square as the sub-image C2 does. As a result, the moving direction of the user inputs in each control region would be remapped to proper directions in the image space. The image space may be regarded as a vector space formed by the control points A1~A4. The control point A1 may comprise four principal vectors with respect to other control pints A2~A4. Vector V11 points from control point A1 to A3, vector V12 points from A2 to A1, vector v13 points from A3 to A1 and vector V14 points from A1 to A2. The drag user input in the control region T1 also forms an input vector, and the input vector is mapped to an output vector according to the vectors V11~V14. Similarly, control point A2 has principal vectors V21~V24, and user inputs in the control region T2 are mapped to output vectors according to principal vectors V21~V24. Control point A3 has principal vectors V31~V34, and user inputs in the control region T3 are mapped to output vectors according to principal vectors V31~V34. And control point A4 has principal vectors V41~V44, and user inputs in the control region T4 are mapped to output vectors according to principal vectors V41~V44. For user inputs in the control region T5, if the user input is in horizontal direction from left to right, as input vector D1, control points A1~A4 should be horizontally from left to right accordingly. For example, control points A1 and A3 would move along principal vectors V11 and V31 accordingly. Similarly, if the user input is in vertical direction in the control region T5, control points A1 and A2 would move together along the vector formed in-between and control points A3 and A4 would move together.

Figure 6:
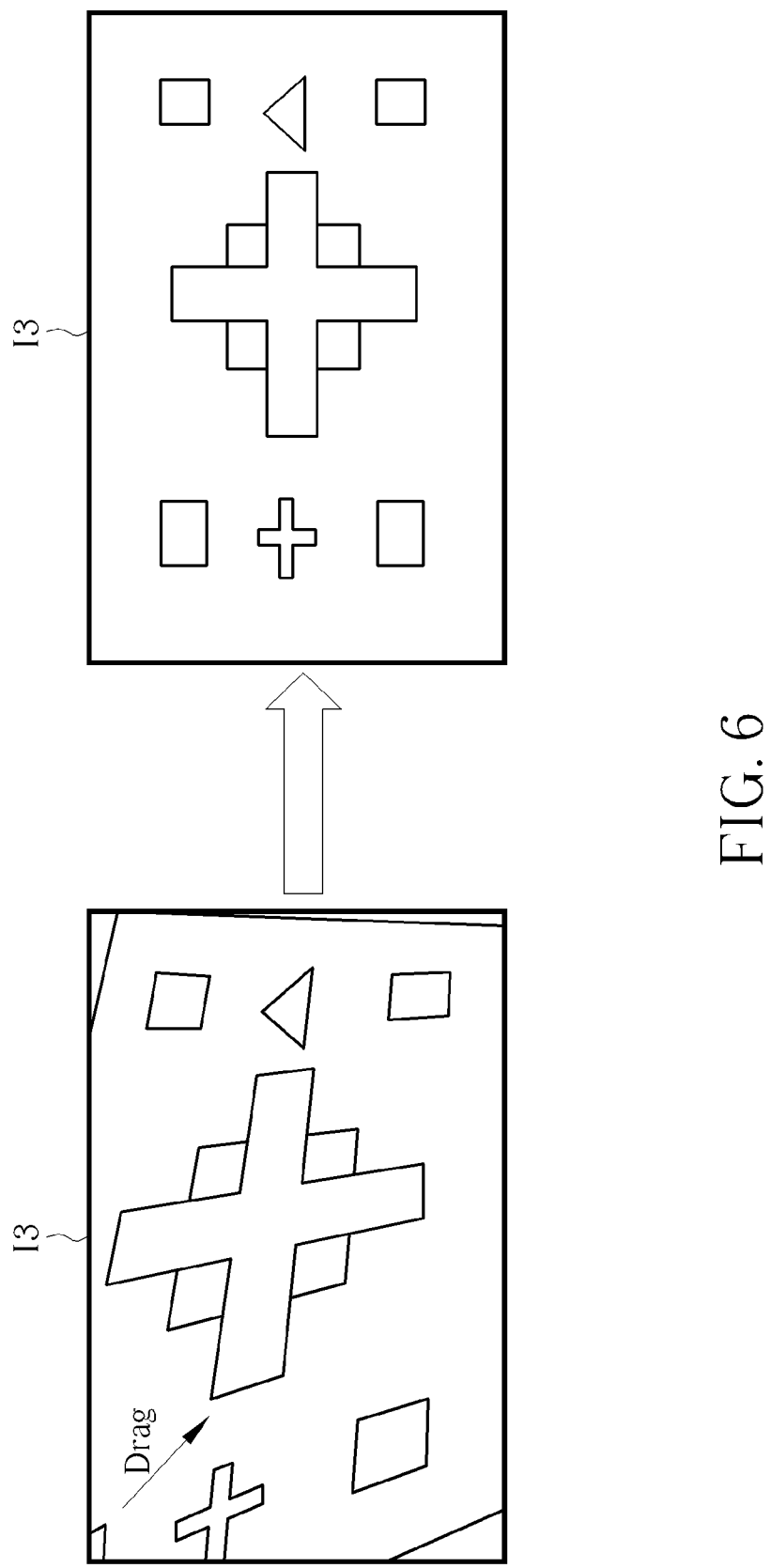
Figure 7:
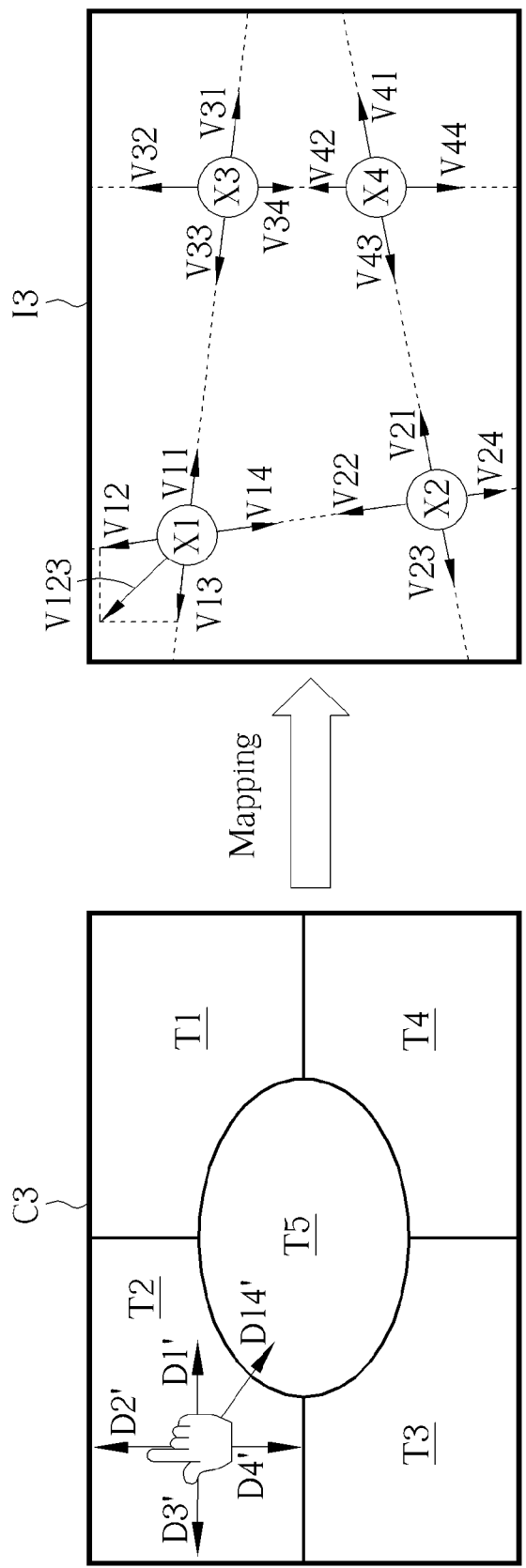

To better illustrate the movement of the control points in response to user inputs, several embodiments will be described in below. However, please note that the invention is not limited to these embodiments. Modifications or variations may be made without departing from the spirit of the invention. Please refer to FIGS. 6~8, which illustrate an example of user input received in a specific control region. As shown in left of FIG. 6, a sub-image C3 is provided on the touch screen 100 to the user. It can be observed that there exists large distortion at the top-left region of the sub-image C3. In this case, user might wish to rectify the distortion and bring in more contents. To achieve this purpose, user may send a drag user input from the top-left corner of the cropping image C3 to an inner position. The drag user input in the cropping space is shown in the left of FIG. 7 and converted as input vector D14. As shown in FIG. 7, the input vector D14 occurs in the control region T1, and maps to an output vector V123 with respect to control point A1 in the image space. Please note that the output vector V123 is in relative opposite direction to the input vector D14. That is, when user drags from an outer position to inner position on the touch screen 100, the attempt is to move the dragged content further inside and reveals uncovered outer contents. To include the previously uncovered contents, the control point has to extend further outside. As a result, the input vector and the output vector point to opposite directions.

Further explained, the input vector D14 is determined by the trace of the user input (for example start point and end point), and can be defined by the combination of the principal vectors D1 and D4 in the cropping space. As can be understood, the cropping space is in rectangular shape with right angles. Thus, each vector in the cropping space can be composed as a combination of two principal vectors, the two vectors form a right angle in between, for example D1 and D4 in FIG. 7. However, in the image space the control points X1~X4 may not form a rectangle or a square, the angles between the principal vectors may not be right angles. Thus vector mapping should be performed to convert the input vector in the cropping space (for example D14) to corresponding output vector in the image space (for example V123). The mapping can be done by determining the ratio of a first angle between D14 and D1 (or D4) and a second angle between V123 and V13 (or V12). And the moving distance of V123 can be mapped from the relative moving distance of D14.

In an embodiment of the invention, the control point X1 and the displayed cropping image C3 can be updated with the drag user input in real-time. That is, when user places his/her finger on the touch screen, the sub-image C3 is updated along with finger movement. The user may stop dragging upon a desired cropping image C3 is disclosed. In this case, the control point X1 is updated with the finger movement as well so that the sub-image C3 can be updated. Please note that the relative vectors V11~V14 corresponding to vectors D1~D4 may also be updated in response to the update of control point X1. In other words, when the control point X1 moves its position, the axes form by the control points X1~X4 would change accordingly. As a result, the pointing directions of the principal vectors V11~V14 relative to control point X1 would change, and also does the output vector V123 in consequent.

Figure 8:
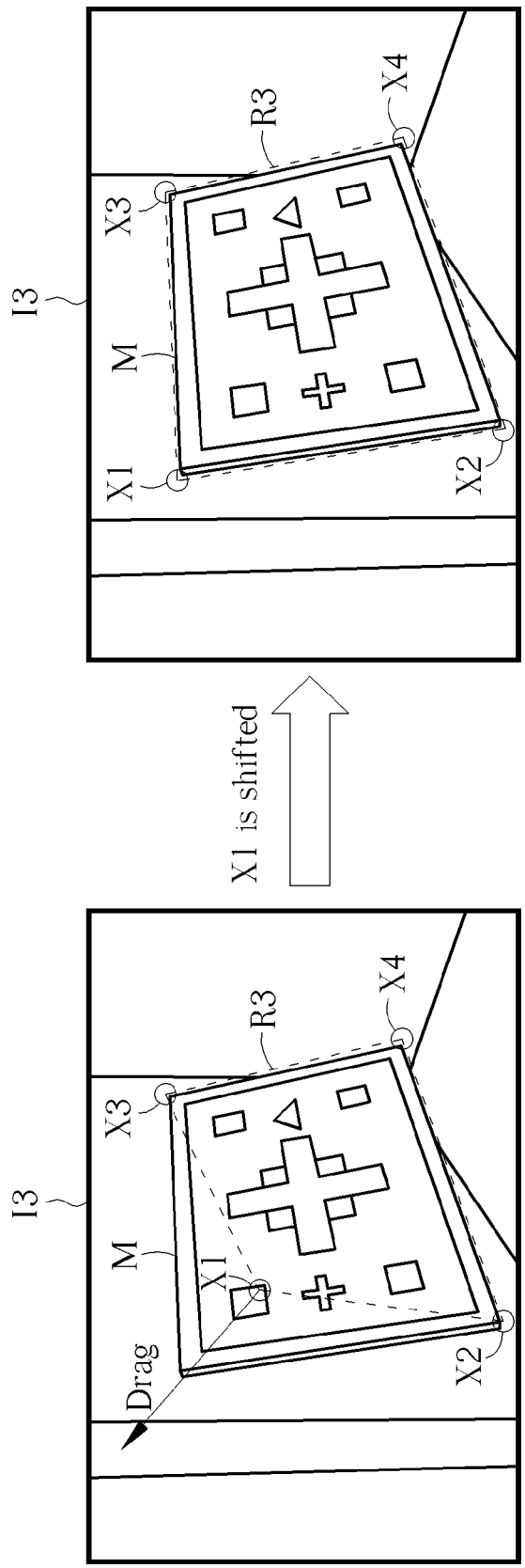

FIG. 8 depicts image cropping in the image space. The sub-region R3 corresponding to the control points X1~X4 is cropped by the image cropping module 220 and displayed as the sub-image C3 of FIG. 6. The control point X1 initially lies inside the object M desired to be cropped. Upon receiving the drag user input from the user, the control point X1 is moved to desired position, which is the top-left corner of object M, as shown in the right of FIG. 8. Please note that even though the sub-region R3 appears in the digital image I3 in a non-rectangular shape, it is mapped into the cropping space in rectangle. Therefore, distortions appears at edge, corner or other portions in sub-region R3 can be rectified in the sub-image C3, as shown in comparison of FIG. 6 and FIG. 8. Pixel values and positions may be adjusted according to the movement of control points, and thus the scale and aspect ratio of the sub-image C3 is adjusted. In the condition that an object within an image is not taken in front view, by cropping and adjusting control points of a sub-region according to the invention, the object can be presented in front view for better view.

Figure 9:
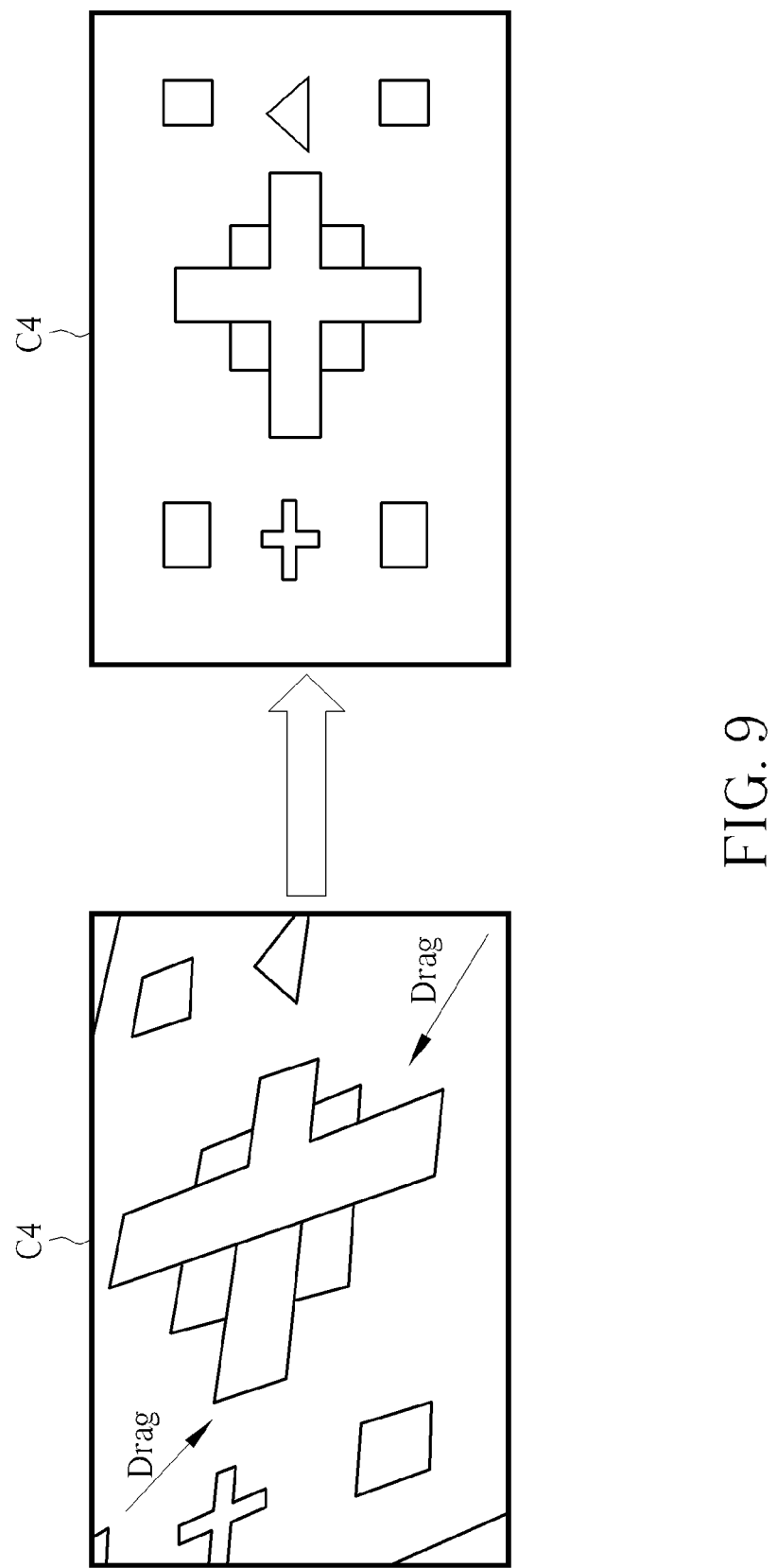
Figure 10:
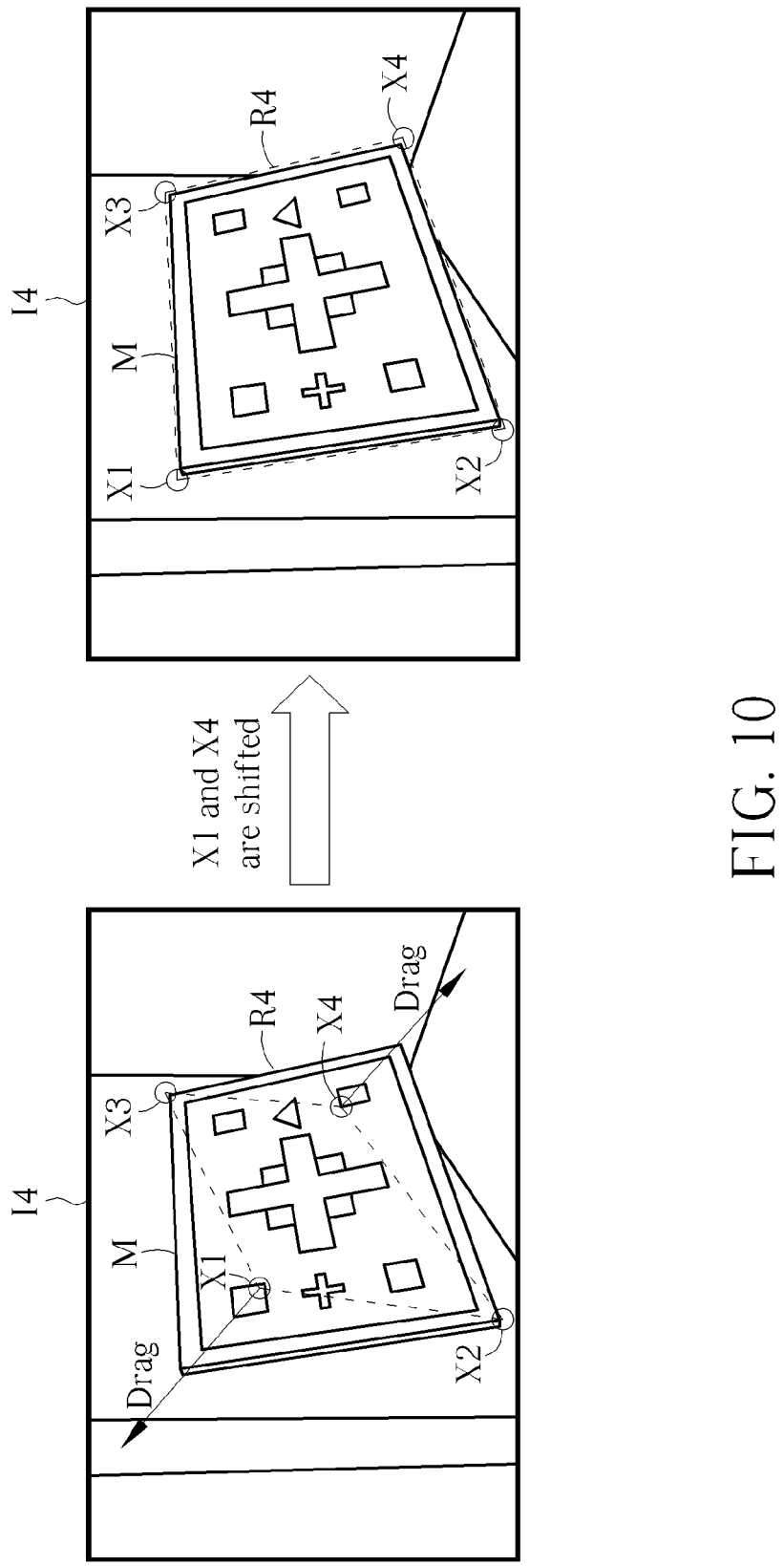
Figure 11:
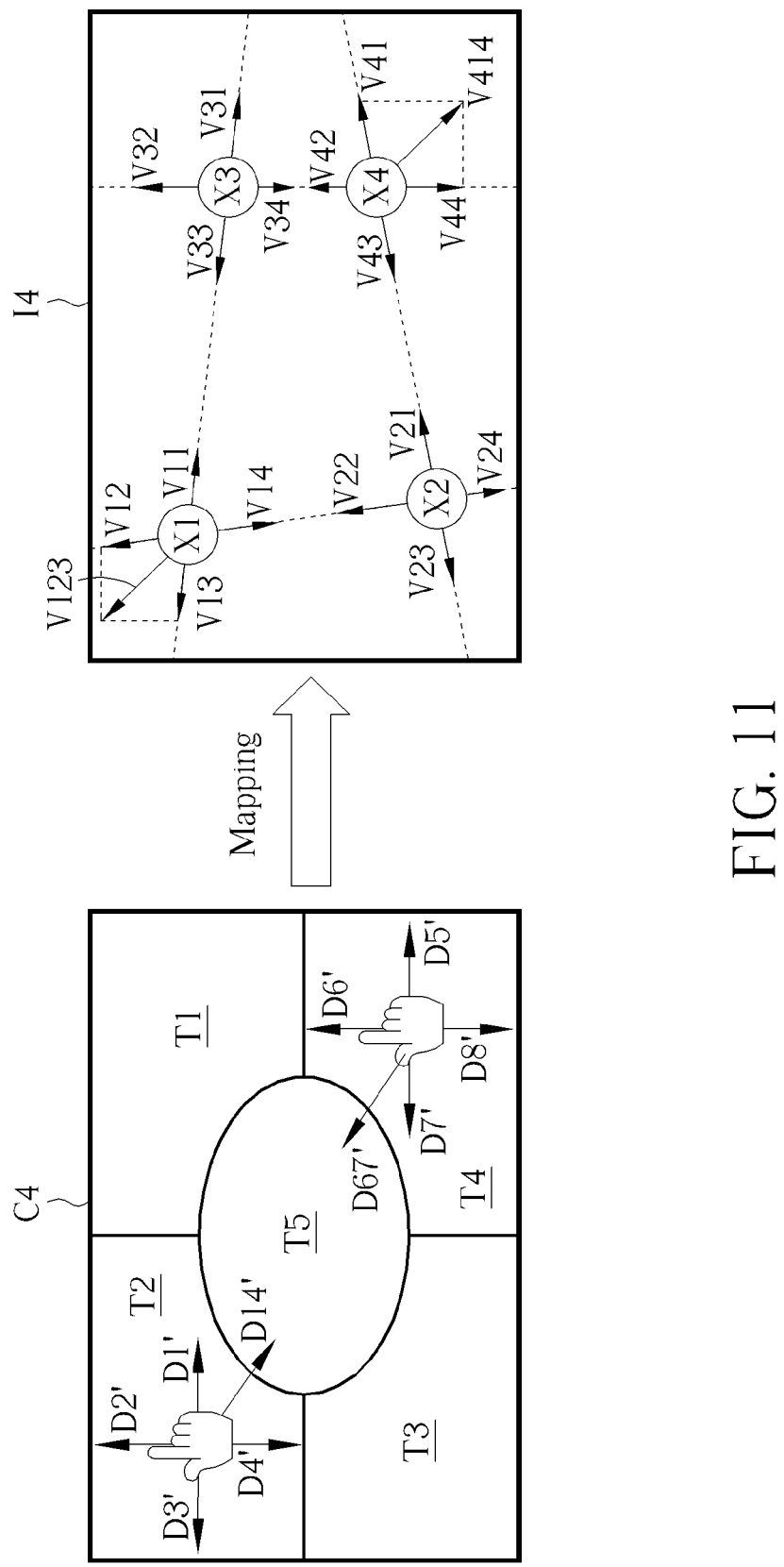

FIGS. 9, 10 and 11 illustrate another embodiment of image cropping of the invention. In this embodiment, the user interface is capable to receive multiple drag user inputs corresponding to multiple control points simultaneously. First please refer to FIG. 9, a sub-image C4 is provided and displayed on a user interface for of the touch screen 100. The sub-image C4 corresponds to a sub-region R4 in the digital image I4 and is defined by control points X1~X4. As shown in the left of FIG. 10, the top-left and bottom-right portions of the digital image I4 are not covered by the sub-region R4. To reveal those uncovered portions, the user may use two fingers to drag from the top-left and bottom-right corners to the center simultaneously (FIG. 9). Corresponding control points X1 and X4 would move outward in the top-left and bottom-right directions respectively (FIG. 10). As described above, the two user inputs are located in the control region T1 and T4 respectively and are converted into two input vectors D14 and D67. The input vectors D14 and D67 are mapped into the image space as output vectors V123 and V414, but the input vectors and the output vectors are of relative opposite directions. The mapping of input vector D14 and the output vector V123 is similar to the embodiment of FIG. 7. The mapping of D67 and V414 can be done by determining the ratio of a first angle between D67 and D6 (or D7) and a second angle between V414 and V44 (or V41). And the moving distance of V414 can be mapped from the relative moving distance of D67.

Please note that the user input may be a single input corresponding to one control point or multiple inputs corresponding to multiple control points. In the latter case, the multiple inputs may correspond to any combination of the control points, such as X1 and X4 in FIGS. 10 and 11, X1 and X2, or even X1, X2 and X3.

Figure 12:
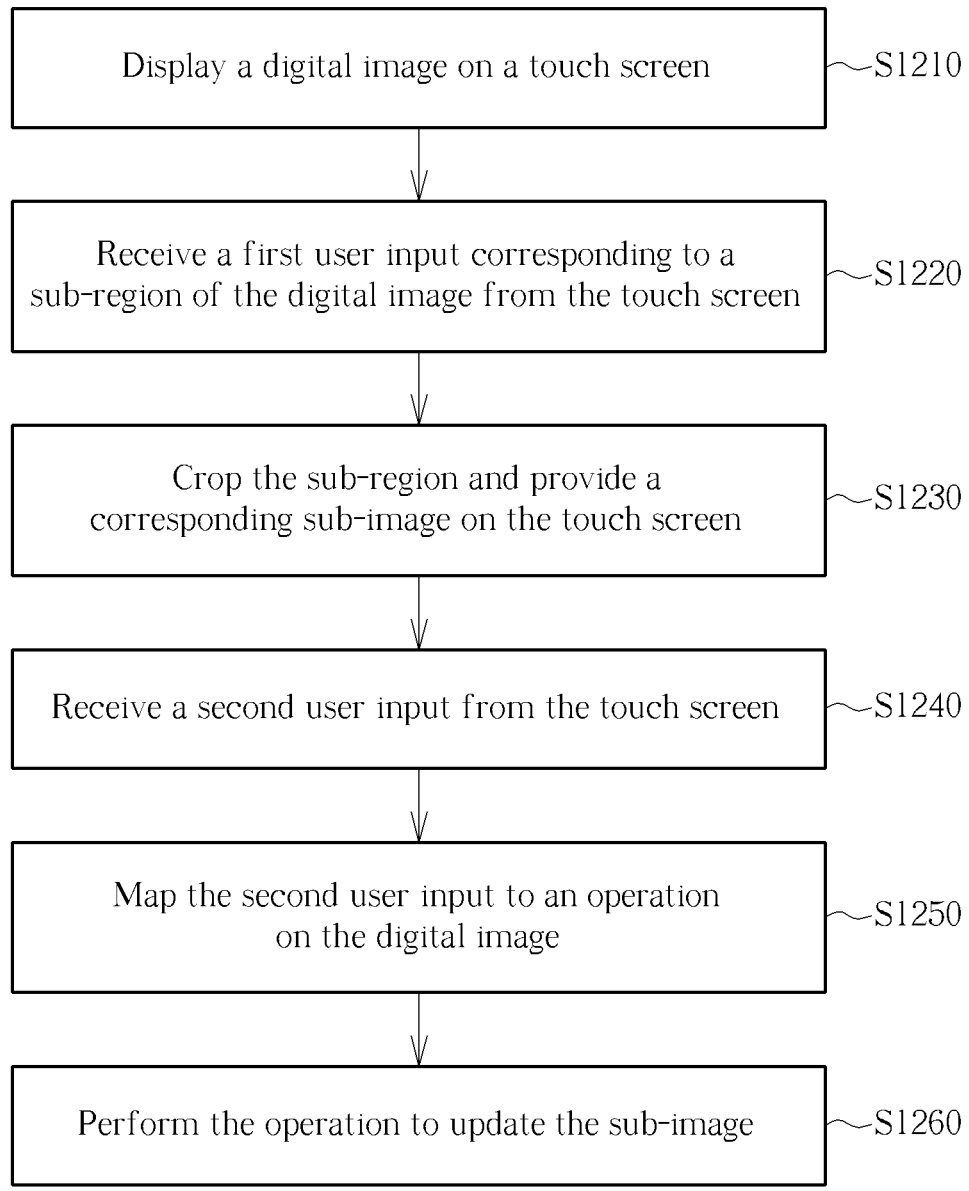
FIG. 12-13 illustrate image cropping manipulation methods according to embodiments of the present invention.

Please refer to FIG. 12. FIG. 12 illustrates an image cropping manipulation method according to an embodiment of the invention. The image cropping manipulation method may be implemented in a portable electronic device, such as a smart phone, tablet, and/or others. The portable electronic device may comprise touch screen for displaying images and providing a user interface to receive user inputs. The portable electronic device may also comprise an image processing unit for performing various image processing. Starting from step S1210, a digital image is displayed on the touch screen. The digital image can be captured by a camera module of the portable electronic device or be accessed from internal or external storage unit. Next the touch screen receives a first user input corresponding to a sub-region of the digital image in step S1220. As mentioned, the touch screen may provide user interface for receiving user inputs corresponding to various operations. In the embodiment of the invention, the user interface may comprise image edit functions, such as rotate, crop, effect, etc. User may select a desired function via the user interface, for example crop in this embodiment. The user input may comprise information of a sub-region to be cropped. In step S1230, the image processing unit of the portable electronic device crops the sub region from the digital image and provides a corresponding sub-image on the touch screen. Please note that the digital image displayed on the touch screen may be of preview resolution, which is lower than original resolution. The sub region may be cropped from the digital image of full resolution, and be processed prior to generate the sub-image.

While viewing the sub-image, user may wish to apply further operations on the sub-image. The touch screen may also provide user interface for receiving user inputs corresponding to operations on the sub-image. For example, the cropped sub-image may not be satisfying and the user wants to modify the scope of the sub-image. In step S1240, the touch screen receives a second user input for editing the sub-image. The user input may be a single-touch or multi-touch gesture, and comprise information of position(s) user desires to modify. For example, user may apply a drag input moving from left to right to indicate that he/she wants to crop a sub-region further left in the digital image to the currently displayed sub-image. In another example, user may drag from one or more corners of the sub-image to extend the sub-region broader in the digital image. Please note that user may directly send user inputs on the sub-image to modify its content without returning to the digital image for selecting a new sub-region to be cropped. In step S1250, the user input is mapped to an operation on the digital image. In embodiments of the invention, the image processing unit defines an image space corresponding to the digital image and a cropping space corresponding to the sub-image. The user input received from the touch screen in first determined in the cropping space and converted to an operation in the image space. That is to say, the actual operation takes place on the digital image, however the user input is received on the sub-image. A plurality of control regions corresponding to the sub-image are determined in cropping space, and a plurality of control points corresponding to the sub-region are determined in the image space. User inputs fall in one or more of the control regions can be mapped to adjustment of one or more control points. The image processing unit may convert the user input to an input vector in corresponding control region, and map the input vector to an output vector with respect to corresponding control point in the image space. In step S1260, the image processing unit performs corresponding operation to update the sub-image. The control point is moved according to the output vector, leading to the adjustment of the sub-region. By adjusting the positions of the control points, the sub-region is adjusted accordingly and thus the sub-image is updated. Please note that the input vector and the output vector are of relative opposite direction. For example, if the input vector points from left to right (i.e. user input is a drag from left to right), the output vector points from right to left (i.e. control point moves from right to left).

Figure 13:
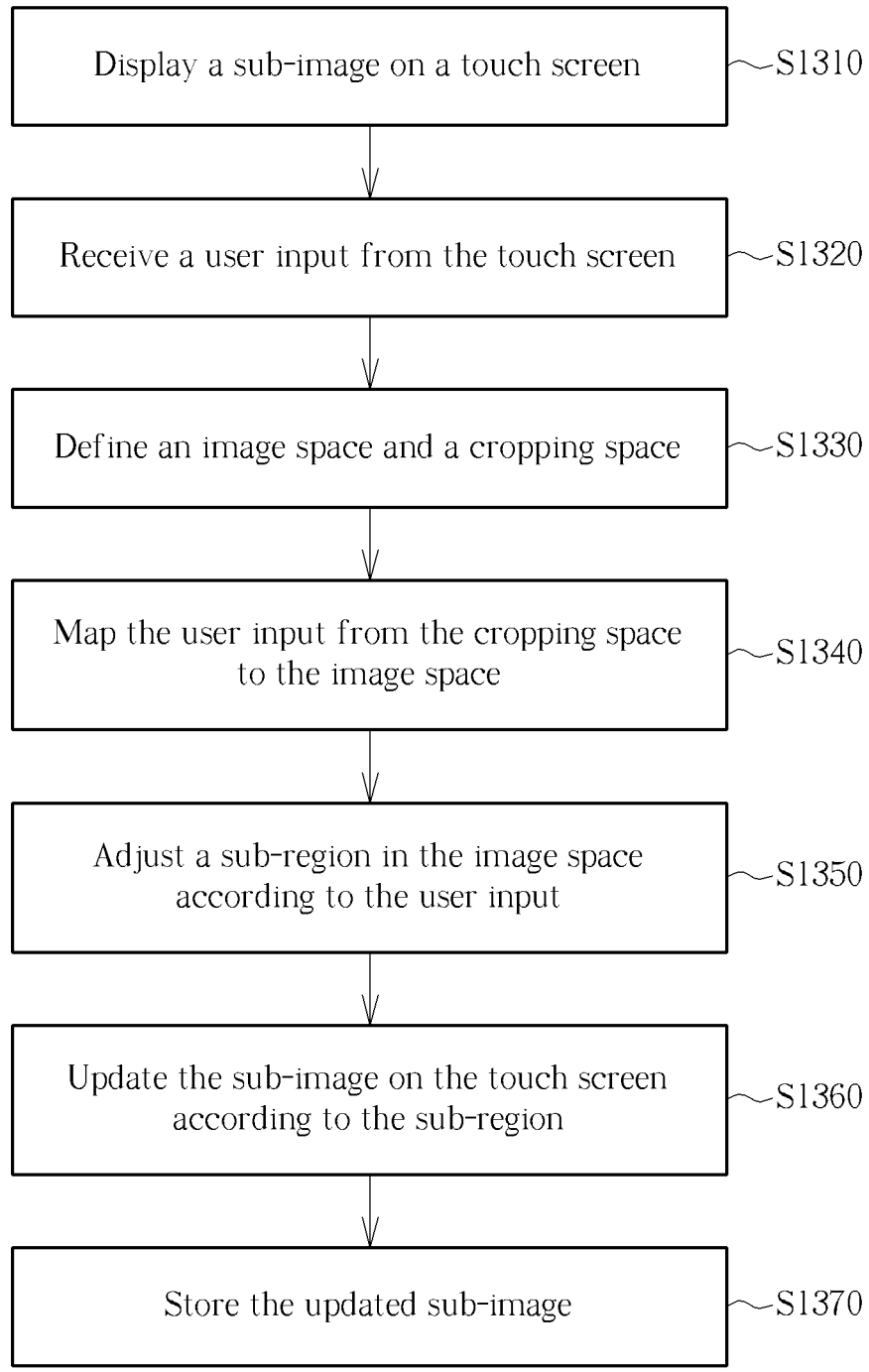

FIG. 13 illustrates another embodiment of image cropping manipulation method of the invention. Similar to the embodiment of FIG. 12, this embodiment may be implemented in a portable electronic device comprising a touch screen and an image processing unit. In step S1310, a sub-image is displayed on the touch screen. The sub-image corresponds to a sub-region cropped from a digital image. In step S1320, a user input is received from the touch screen. The touch screen may provide user interface for receiving user inputs corresponding to various operations to the sub-image. In step S1330, the image processing unit defines an image space corresponding to the digital image and a cropping space corresponding to the sub-image. Please note that step S1330 may be performed prior to step S1320. In the image space, a sub-region corresponding to the sub-image is defined by a plurality of control points. In the cropping space, a plurality of control regions is defined. Each of the control regions corresponds to one or more of the control points. In step S1340, the image processing unit maps the user input from the cropping space to the image space. The image processing unit determines one or more control regions in which the user input is received. If the user input is a single-touch gesture, a corresponding control region is determined. If the user input is a multi-touch gesture, control regions corresponding to the multi-touch are determined. The movement of the user input is converted to an input vector in the corresponding control region. And the input vector is then mapped to an output vector of the corresponding control point. In step S1350, the image processing unit adjusts the sub-region in the image space according to the user input. The image processing unit adjusts the control point according to the output vector, which is mapped and converted from the user input. As described earlier, the sub-region is defined by the control points. By adjusting positions of the control points, the sub-region is adjusted accordingly and again cropped from the digital image. Then in step S1360, the sub-image is updated accordingly on the touch screen. Please note that the update of the sub-image may be performed synchronously with the receiving of the user input. That is to say, the sub-image is updated along with the movement of the user input with minimum delay or without delay. Also, the user input is directly applied during the display of the sub-image. Although operations of the user input are performed on the digital image in image space, the user interface stays in the cropping space of the sub-image. Last in step S1370, the updated sub-image may be stored in storage unit of the portable electronic device or an external storage device. For example, user may store the sub-image in the memory of the portable electronic device or upload the sub-image to a social media server.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device for performing image cropping manipulation, comprising:

a touch screen configured to display a sub-image and to provide a user interface for receiving at least one user input, the sub-image is cropped from a digital image; and an image processing unit, configured to perform an operation corresponding to the user input, the image processing unit comprises:

a space mapping module, configured to map the sub-image to an image space and map the user input to the operation in the image space; and an image cropping module, configured to perform the operation and update the sub-image according to the user input;

wherein the space mapping module is further configured to define the image space corresponding to the digital image and a cropping space corresponding to the sub-image, and is configured to map the user input from the cropping space to the image space for adjusting a sub-region in the image space, and the sub-region is corresponding to the sub-image and is defined according to a plurality of control points;

wherein the user input is converted to an input vector in the cropping space and mapped to an output vector with respect to at least one control point in the image space, and the input vector is in relative opposite direction to the output vector; and wherein the space mapping module decomposes the input vector to at least two perpendicular principal vectors in the cropping space, decomposes the output vector to at least two principal vectors in the image space and maps the input vector to the output vector according to a first angle and a second angle wherein the first angle is between the in out vector and one of the perpendicular principal vectors of the input vector, and the second angle is between the output vector and one of the principal vectors of the output vector.

2. The portable electronic device of claim 1, wherein the space mapping module defines the plurality of control points in the image space and a plurality of corresponding control regions in the cropping space, and the space mapping module determines at least a first control region where the user input is received and maps the user input to an operation of at least a first control point corresponding to the first control region.

3. The portable electronic device of claim 2, wherein the space mapping module adjusts positions of the control points in the image space according to the user input, and the image cropping module updates the sub-image according to the adjusted control points.

4. The portable electronic device of claim 1, further comprising:
a camera module, configured to capture the digital image; and
a storage unit, configured to store the digital image and the sub-image.

5. The portable electronic device of claim 1, wherein the user input is received without returning to display of the digital image.

6. The portable electronic device of claim 1, wherein the sub-region in the image space corresponds to a non-front view of an object in the digital image, and the sub-image in the cropping space corresponds to a front view of the object.

7. The portable electronic device of claim 1, wherein when a control point of the plurality of control points is displaced over a distance, the first angle corresponding to the input vector and the second angle corresponding to the output vector are varied with a movement of the control point.

8. An image cropping manipulation method for use in a portable electronic device, the portable electronic device comprises a touch screen and an image processing unit, the method comprising:
displaying a sub-image on the touch screen, the sub-image is cropped from a digital image;
receiving a user input from the touch screen;
in response to the user input, map the user input to an operation on the digital image; and
performing the operation to update the sub-image, comprising:
defining an image space corresponding to the digital image and a cropping space corresponding to the sub-image;
converting the user input to an input vector in the cropping space;
decomposing the input vector to at least two perpendicular principal vectors in the cropping space;
mapping the input vector to an output vector with respect to at least one control point in the image space according to a first angle and a second angle; and
adjusting a sub-region corresponding to the sub-image in the image space according to the user input;
wherein the first angle is between the input vector and one of the perpendicular principal vectors of the input vector, the second angle is between the output vector and one of principal vectors decomposed from the output vector, the input vector is in relative opposite direction to the output vector, and the sub-region is corresponding to the sub-image and is defined according to a plurality of control points.

9. The image cropping manipulation method of claim 8, wherein the mapping of the user input further comprises:
defining the plurality of control points in the image space and a plurality of corresponding control regions in the cropping space;
determining at least a first control region where the user input is received; and
mapping the user input to an operation of at least a first control point corresponding to the first control region.

10. The image cropping manipulation method of claim 9, wherein the plurality of control points define the sub-region corresponding to the sub-image in the image space.

11. The image cropping manipulation method of claim 9, wherein the determining of the sub-region further comprises:
adjusting positions of the control points in the image space according to the user input; and
updating the sub-image according to the adjusted control points.

12. The image cropping manipulation method of claim 8, further comprising storing the updated sub-image.

13. The image cropping manipulation method of claim 8, wherein the sub-region in the image space corresponds to a non-front view of an object in the digital image, and the sub-image in the cropping space corresponds to a front view of the object.

14. The image cropping manipulation method of claim 8, wherein when a control point of the plurality of control points is displaced over a distance, the first angle corresponding to the input vector and the second angle corresponding to the output vector are varied with a movement of the control point.

* * * * *